United States Patent
Ebisawa

(10) Patent No.: US 8,565,224 B2
(45) Date of Patent: Oct. 22, 2013

(54) TELEPHONE SYSTEM, TELEPHONE EXCHANGE APPARATUS, AND CONNECTION CONTROL METHOD USED IN TELEPHONE EXCHANGE APPARATUS

(75) Inventor: Yoshimitsu Ebisawa, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 305 days.

(21) Appl. No.: 13/019,827

(22) Filed: Feb. 2, 2011

(65) Prior Publication Data

US 2011/0228762 A1  Sep. 22, 2011

(30) Foreign Application Priority Data

Mar. 17, 2010  (JP) .................................. 2010-061536

(51) Int. Cl.
*H04L 12/66* (2006.01)

(52) U.S. Cl.
USPC .......................................................... 370/352

(58) Field of Classification Search
USPC .......................................................... 370/352
See application file for complete search history.

(56) References Cited

U.S. PATENT DOCUMENTS

| | | | | |
|---|---|---|---|---|
| 5,940,479 | A * | 8/1999 | Guy et al. | ................... 379/93.01 |
| 7,251,253 | B2 | 7/2007 | Funato et al. | |
| 2003/0053445 | A1 | 3/2003 | Funato et al. | |
| 2004/0015548 | A1 * | 1/2004 | Lee | ................. 709/204 |
| 2004/0252691 | A1 | 12/2004 | Hori et al. | |
| 2006/0280204 | A1 * | 12/2006 | Nagata et al. | ................. 370/473 |
| 2007/0147411 | A1 | 6/2007 | Bijwaard et al. | |
| 2009/0143029 | A1 | 6/2009 | Matsumoto et al. | |
| 2011/0122873 | A1 | 5/2011 | Bijwaard et al. | |

FOREIGN PATENT DOCUMENTS

| | | |
|---|---|---|
| JP | 2003-092584 | 3/2003 |
| JP | 2004-320382 | 11/2004 |
| JP | 2008-147887 | 6/2008 |
| JP | 2009-141481 | 6/2009 |
| JP | 2009-521843 | 6/2009 |
| WO | WO 2007-075398 | 7/2007 |

OTHER PUBLICATIONS

Japanese Patent Application No. 2010-06-10; Notice of Reasons for Rejection; Mailed Jun. 14, 2011 (English translation).

* cited by examiner

*Primary Examiner* — Kwang B Yao
*Assistant Examiner* — Tung Q Tran
(74) *Attorney, Agent, or Firm* — Blakely, Sokoloff, Taylor & Zafman LLP

(57) ABSTRACT

According to one embodiment, a telephone exchange apparatus includes a connector, a memory, a determination module and a controller. The connector performs a part of the function of the media server and connect a distribution server that distributes an input media packet to the telephone terminals. The memory stores a connection management table indicating a correspondence relation between a terminal ID, a server ID and codec information, when a call connection related to the unicast packet distribution is established. The determination module refers to the connection management table when performing the unicast packet distribution, and determines whether there is a call connection using the same codec information based on reference result of the connection management table. The controller dynamically connects a plurality of telephone terminals using the same codec to a media server via the distribution server.

8 Claims, 11 Drawing Sheets

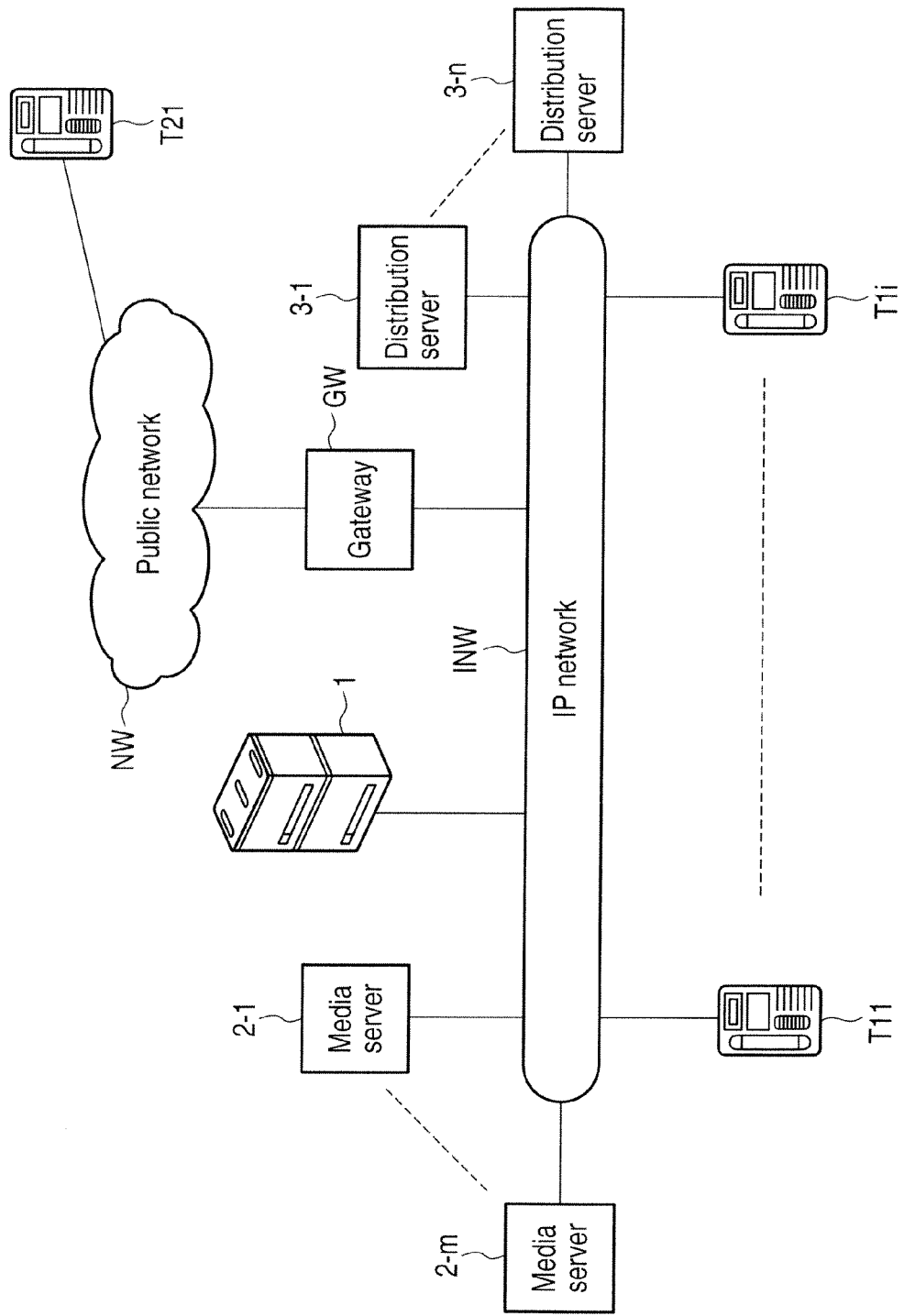
F I G. 1

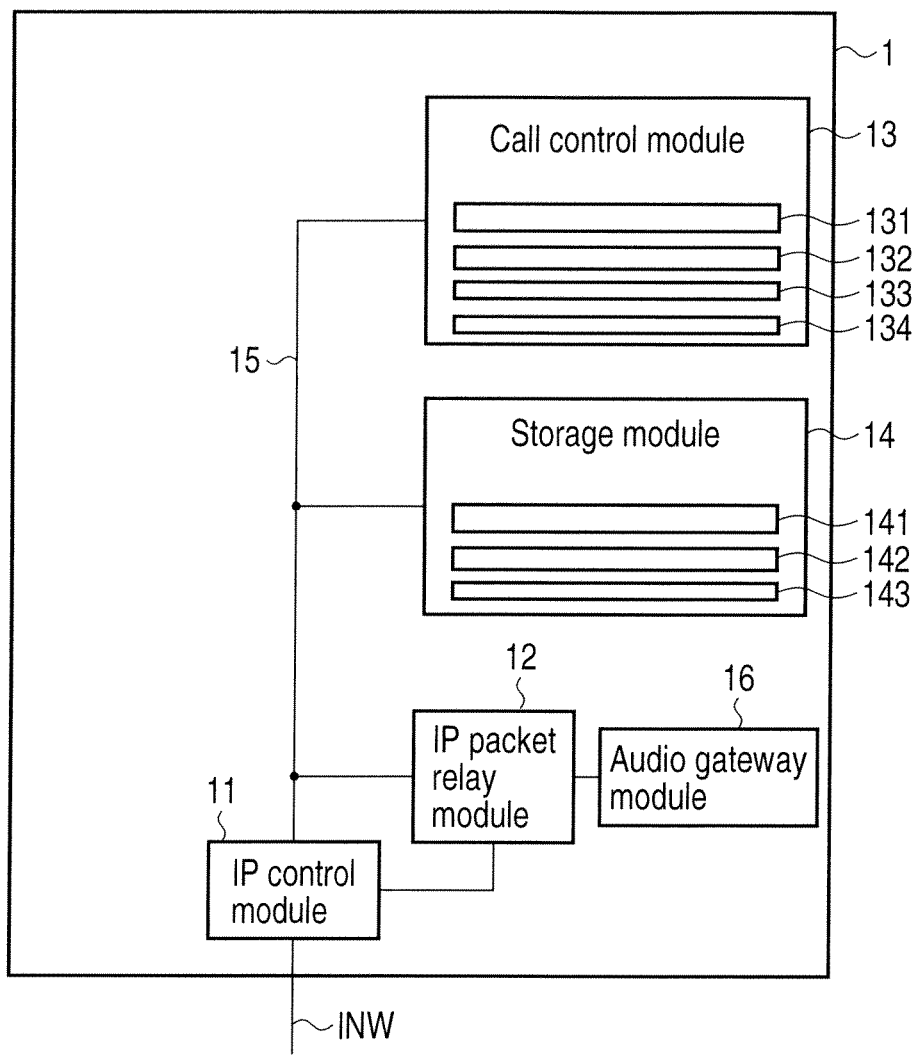
F I G. 2

| Originating point | Terminating point | Codec | Packet transmission interval | Listening tone (in the case of terminal) | Intended use (in the case of MS) |
|---|---|---|---|---|---|
| Terminal 1 | Media server 1 | G.711 μ-law | 20ms | Holding tone 1 | – |
| Terminal 2 | Media server 2 | G.711 μ-law | 40ms | Holding tone 2 | – |
| Terminal 3 | Media server 3 | G.711 μ-law | 20ms | Holding tone 2 | – |
| Terminal 4 | Media server 4 | G.711 μ-law | 20ms | Holding tone 1 | – |
| Media server 1 | Terminal 1 | G.711 μ-law | 20ms | – | Sending holding tone 1 |
| Media server 2 | Terminal 2 | G.711 μ-law | 40ms | – | Sending holding tone 1 |
| Media server 3 | Terminal 3 | G.711 μ-law | 20ms | – | Sending holding tone 2 |
| Media server 4 | Terminal 4 | G.711 μ-law | 20ms | – | Sending holding tone 1 |

FIG. 3

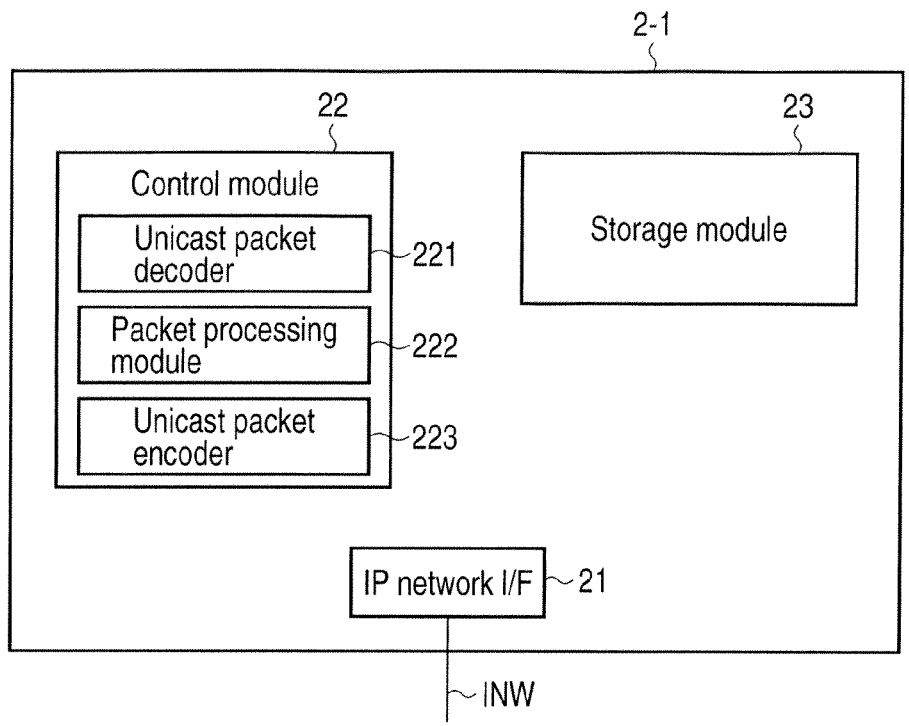
F I G. 4
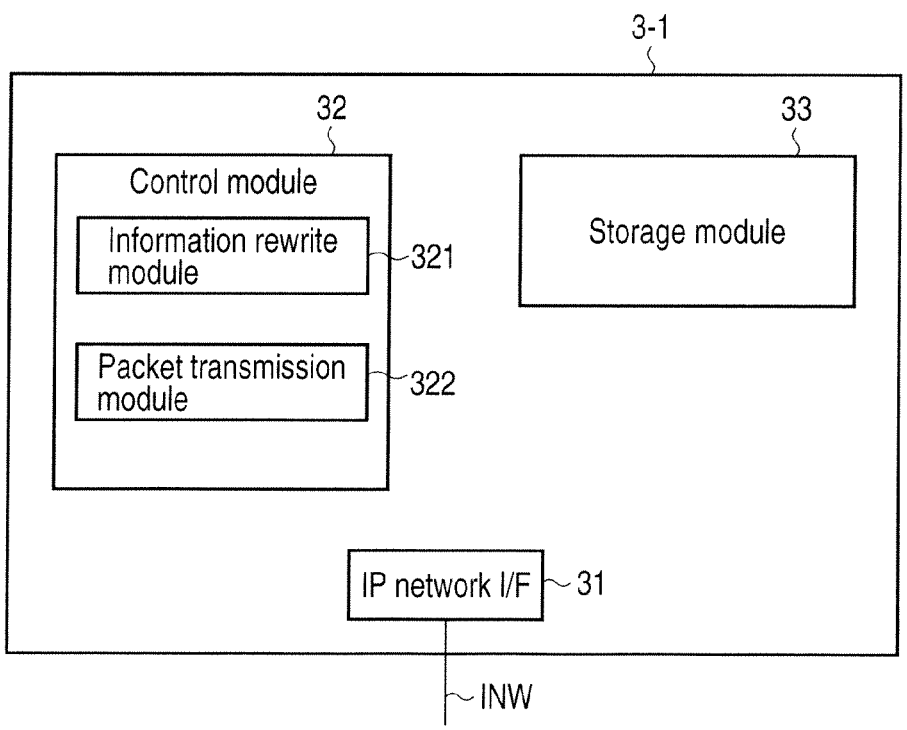
F I G. 5

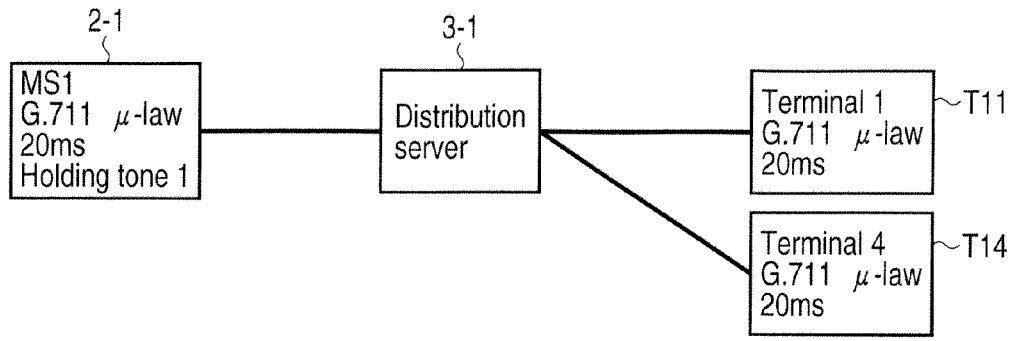

FIG. 9

| Originating point | Terminating point | Codec | Packet transmission interval | Listening tone (in the case of terminal) | Intended use (in the case of MS) |
|---|---|---|---|---|---|
| Terminal 1 | Distribution server 1 output | G.711 μ-law | 20ms | Holding tone 1 | — |
| Terminal 4 | Distribution server 1 output | G.711 μ-law | 20ms | Holding tone 1 | — |
| Media server 1 | Distribution server 1 input | G.711 μ-law | 20ms | — | Sending holding tone 1 |

FIG. 10

| Distribution server name | Input | Output |
|---|---|---|
| Distribution server 1 | Media server 1 | Terminal 1 |
| | | Terminal 4 |

FIG. 11

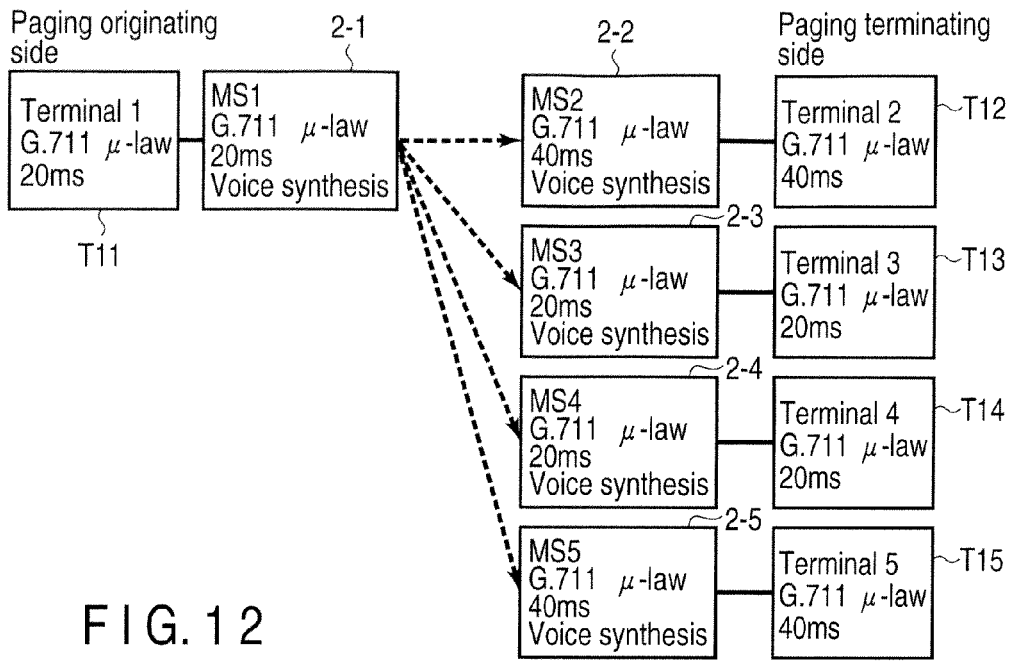

FIG. 12

| Originating point | Terminating point | Codec | Packet transmission interval | Listening tone (in the case of terminal) | Intended use(in the case of MS) |
|---|---|---|---|---|---|
| Terminal 1 | Media sever 1 | G.711 μ-law | 20ms | — | — |
| Terminal 2 | Media sever 2 | G.711 μ-law | 40ms | Terminal 1 | — |
| Terminal 3 | Media sever 3 | G.711 μ-law | 20ms | Terminal 1 | — |
| Terminal 4 | Media sever 4 | G.711 μ-law | 20ms | Terminal 1 | — |
| Terminal 5 | Media sever 5 | G.711 μ-law | 40ms | Terminal 1 | — |
| Media sever 1 | Terminal 1 | G.711 μ-law | 20ms | — | Voice synthesis |
| Media sever 2 | Terminal 2 | G.711 μ-law | 40ms | — | Voice synthesis |
| Media sever 3 | Terminal 3 | G.711 μ-law | 20ms | — | Voice synthesis |
| Media sever 4 | Terminal 4 | G.711 μ-law | 20ms | — | Voice synthesis |
| Media sever 5 | Terminal 5 | G.711 μ-law | 40ms | — | Voice synthesis |

FIG. 13

| Sound source /listener | Terminal 1 | Terminal 2 | Terminal 3 | Terminal 4 | Terminal 5 |
|---|---|---|---|---|---|
| MS1 | 0 | 1 | 1 | 1 | 1 |
| MS2 | 0 | 0 | 0 | 0 | 0 |
| MS3 | 0 | 0 | 0 | 0 | 0 |
| MS4 | 0 | 0 | 0 | 0 | 0 |
| MS5 | 0 | 0 | 0 | 0 | 0 |
0 - Not listening in   1 - Listening in
F I G. 14
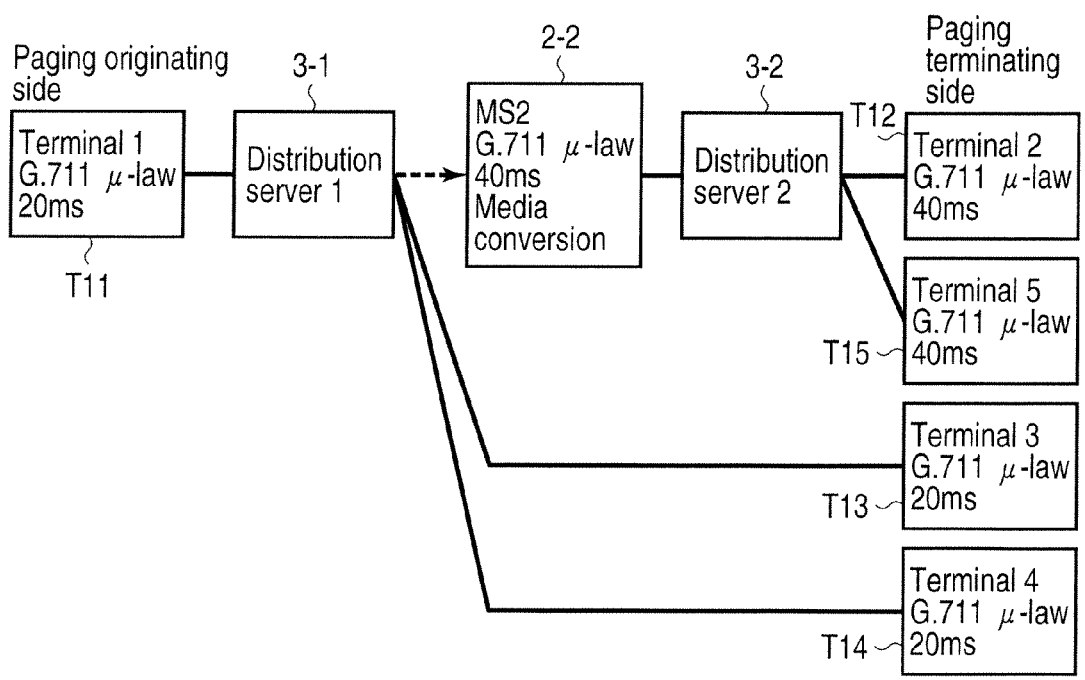
F I G. 15

| Originating point | Terminating point | Codec | Packet transmission interval | Listening tone (in the case of terminal) | Intended use (in the case of MS) |
|---|---|---|---|---|---|
| Teminal 1 | Distribution server 1 input | G.711 μ-law | 20ms | — | — |
| Teminal 2 | Distribution server 2 output | G.711 μ-law | 40ms | Teminal 1 | — |
| Teminal 3 | Distribution server 1 output | G.711 μ-law | 20ms | Teminal 1 | — |
| Teminal 4 | Distribution server 1 output | G.711 μ-law | 20ms | Teminal 1 | — |
| Teminal 5 | Distribution server 2 output | G.711 μ-law | 40ms | Teminal 1 | — |
| Media server 2 | Distribution server 2 input | G.711 μ-law | 40ms | — | Media conversion |

FIG. 16

| Distribution server name | Input | Output |
|---|---|---|
| Distribution server 1 | Teminal 1 | Media server 2 |
| | | Teminal 3 |
| | | Teminal 4 |
| Distribution server 2 | Media server 2 | Teminal 2 |
| | | Teminal 5 |

FIG. 17

| Sound source / listener | MS2 |
|---|---|
| Distribution server 1 | 1 |

FIG. 18

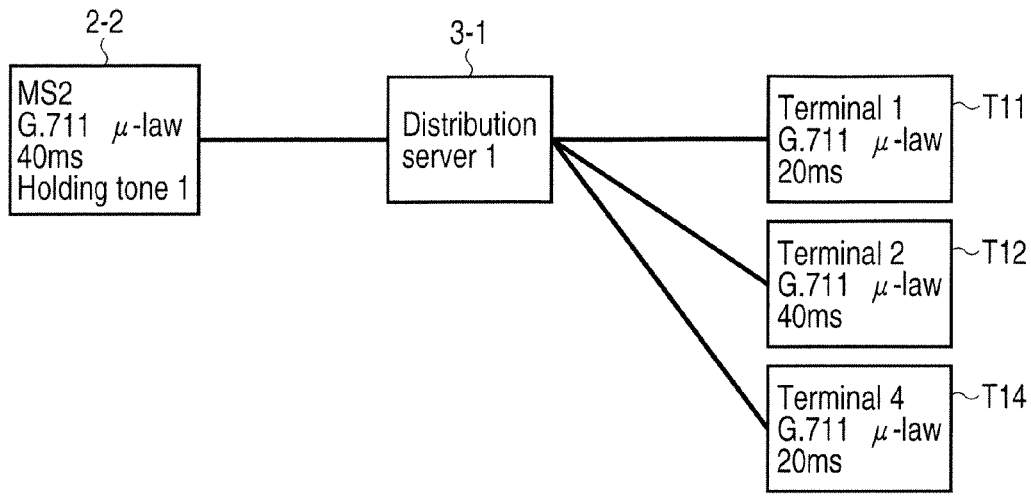
F I G. 19
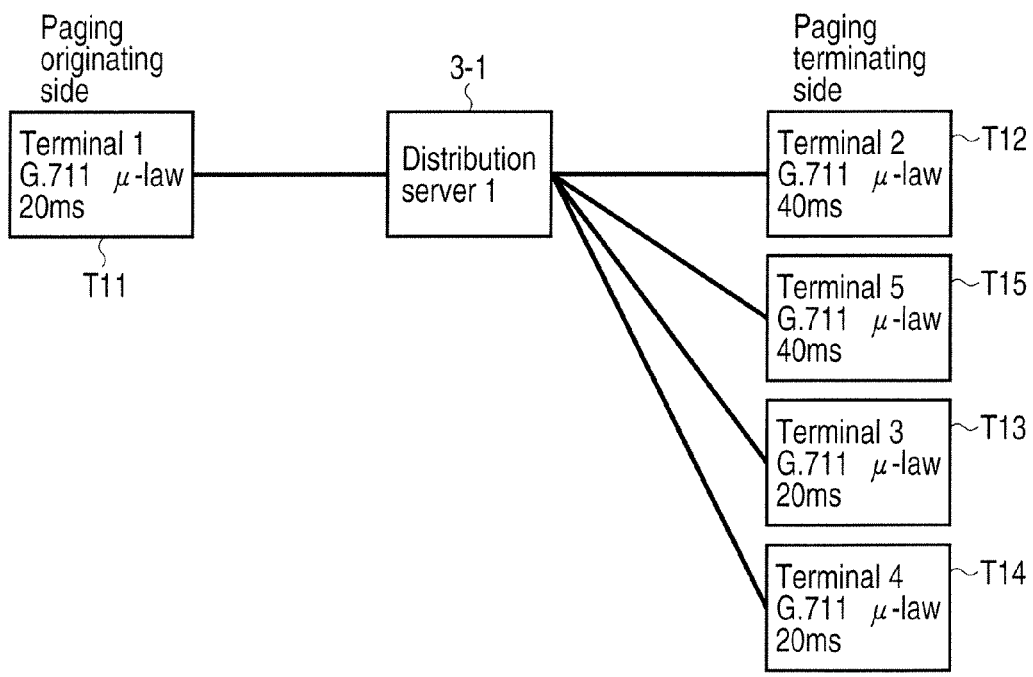
F I G. 20

TELEPHONE SYSTEM, TELEPHONE EXCHANGE APPARATUS, AND CONNECTION CONTROL METHOD USED IN TELEPHONE EXCHANGE APPARATUS

CROSS-REFERENCE TO RELATED APPLICATIONS

This application is based upon and claims the benefit of priority from Japanese Patent Application No. 2010-061536, filed Mar. 17, 2010; the entire contents of which are incorporated herein by reference.

FIELD

Embodiments described herein relate generally to a telephone system which distributes a media packet including at least one of video, audio, and data to a plurality of telephone terminals connected to, for example, an Internet Protocol (IP) network via unicast transmission, a telephone exchange apparatus, and a connection control method used in the telephone exchange apparatus.

BACKGROUND

In recent years, an IP telephone system has been popularized. In the IP telephone system, video and audio are transmitted and received in the form of packet data bi-directionally in real time via an IP network, such as a Local Area Network (LAN). In the IP telephone system, a call control server and a plurality of IP telephone terminals are connected to an IP network and communication between IP telephone terminals or communication between an IP telephone terminal and an outside line can be performed on a call control server basis.

In the IP telephone system, when communication is performed, a session is established between an IP telephone terminal on the calling party side and that on the called party side using such a protocol as SIP under the control of a call control server. After the session has been established, audio communication is performed by peer-to-peer connection which omits a switching process performed by a call control server. In a peer-to-peer connection between IP telephone terminals, audio packets are exchanged between individual IP telephone terminals using a common audio media codec (e.g., G.711, G.722, or G.729).

In the IP telephone system, a specific holding tone is produced so that a caller may hear the tone when the caller is put on hold or a specific tone is made during the call to let the caller hear the tone. In addition, the IP telephone system provides various services using a device called a media server when one-to-many communication or many-to-many communication is performed in a meeting or paging.

A telephone system in which a sound source server that holds a holding tone sends a holding tone packet to a gateway via unicast transmission and the gateway converts the holding tone packet into a unicast one and transmits it to an outside line has been proposed as related technology (e.g., Jpn. Pat. Appln. KOKAI Publication 2008-147887).

The media server can be realized using hardware or software. When the media server is realized using hardware, audio processing requires special hardware. Since the number of simultaneous conversions depends on the number of conversion circuits, offering services simultaneously in response to many calls results in an increase in cost.

When the media server is realized using software, there is a virtual upper limit to the number of simultaneous conversions according to the processing capability of the CPU. To provide services simultaneously in response to many calls, it is necessary to use a high-performance, expensive CPU or provide a plurality of devices on which media server software runs, increasing costs. In addition, since the maximum number of ports used by media servers has already been specified in the contract when media servers are installed, only as many ports as up to the upper limit in the contract can be used even if there are empty ports.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a schematic configuration diagram showing a telephone system according to a first embodiment;

FIG. 2 is a block diagram showing a functional configuration of an IP telephone apparatus according to the first embodiment;

FIG. 3 is a table showing an example of the contents stored in a connection information database shown in FIG. 2;

FIG. 4 is a block diagram showing a functional configuration of a media server shown in FIG. 1;

FIG. 5 is a block diagram showing a functional configuration of each of the distribution servers 3-1 to 3-n shown in FIG. 1;

FIG. 9 shows a holding tone sending state when connection has been made again so that a holding tone may be sent via a distribution server in the first embodiment;

FIG. 10 is a table showing an example of the contents stored in a connection information database 141 after connection has been made again in the first embodiment;

FIG. 11 is a table showing an example of the contents stored in a distribution server connection information database 143 after connection has been made again in the first embodiment;

FIG. 12 shows a normal paging connection state in a second embodiment;

FIG. 13 is a table showing an example of the contents stored in a connection information database in the second embodiment;

FIG. 14 is a table showing an example of the contents stored in a media server listening information database in the second embodiment;

FIG. 15 shows a paging connection state when connection has been made again so that data may be sent via a distribution server in the second embodiment;

FIG. 16 is a table showing an example of the contents stored in a connection information database 141 after connection has been made again in the second embodiment;

FIG. 17 is a table showing an example of the contents stored in a distribution server connection information database after connection has been made again in the second embodiment;

FIG. 18 is a table showing an example of the contents stored in a media server listening information database after connection has been made again in the second embodiment;

FIG. 19 shows a holding tone sending state when connection has been made again so that a holding tone may be sent via a distribution server according to a modification of the first embodiment; and FIG. 20 shows a paging connection state when connection has been made again so that data may be sent via a distribution server according to a modification of the second embodiment.

DETAILED DESCRIPTION

Figure 6:
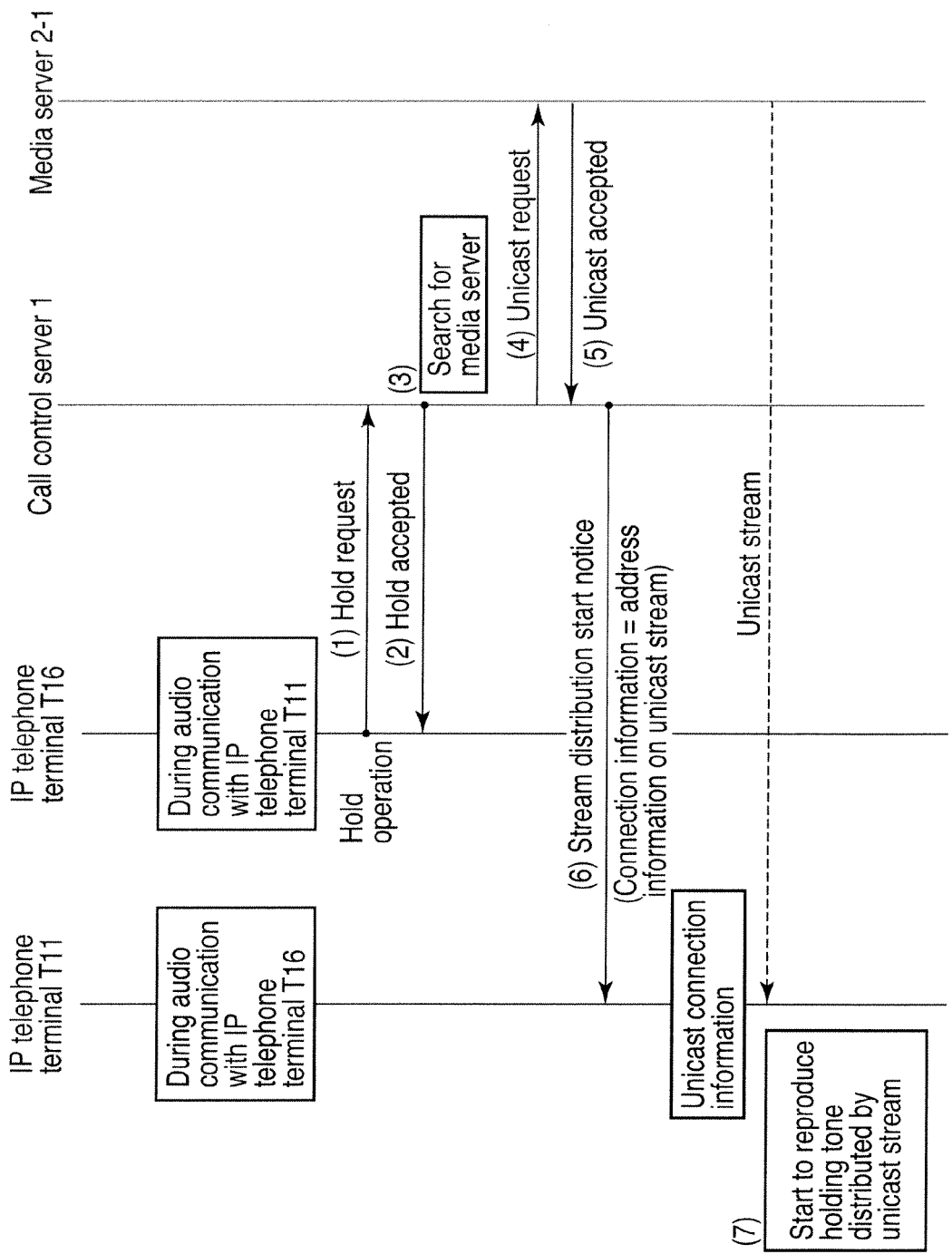
FIG. 6 shows a signal sequence in switching the communication destination of an IP telephone terminal to a media server during a call between IP telephone terminal T11 and IP telephone terminal T16.

Various embodiments will be described hereinafter with reference to the accompanying drawings. In general, according to one embodiment, a telephone system includes a plurality of telephone terminals, a telephone exchange apparatus, a plurality of media servers and a distribution server. The plurality of telephone terminals connected to a communication network. The telephone exchange apparatus makes a call connection between the telephone terminals. The plurality of media servers each of performs unicast packet distribution according to an instruction of the telephone exchange apparatus, wherein the unicast packet distribution distributes a media packet including at least one of video, audio, and data to a requesting telephone terminal. The distribution server performs a part of the function of the media server and distribute an input media packet to the telephone terminals. The telephone exchange apparatus includes a memory, a determination module and a controller. The memory stores a connection management table indicating a correspondence relation between a terminal ID, a server ID and codec information, when a call connection related to the unicast packet distribution is established, wherein the terminal ID that identifies a telephone terminal to be connected, the server ID that identifies the media server, and codec information used between the telephone terminal and the media server to correspond to one another. The determination module refers to the connection management table when performing the unicast packet distribution, and determines whether there is a call connection using the same codec information based on a reference result of the connection management table. The controller dynamically connects a plurality of telephone terminals using the same codec to a media server via the distribution server, when the same codec is used in a plurality of call connections based on the determination result at the determination module.

(First Embodiment)

FIG. 1 is a schematic configuration diagram showing a telephone system according to a first embodiment.

This system comprises an Internet Protocol (IP) network INW. Connected to the IP network INW are a call control server 1 serving as a telephone switching apparatus, a plurality of media servers 2-1 to 2-m (m being a natural number), a plurality of IP telephone terminals T11 to T1i (i being a natural number), and a plurality of distribution servers 3-1 to 3-n (n being a natural number). Each of the IP telephone terminals T11 to T1i has a call processing function and a media information processing function.

The call control server 1 has a switching control function which establishes a session according to a specific protocol, such as SIP, MEGACO, or H.323, between IP telephone terminals T11 to T1i or between media servers 2-1 to 2-m or between distribution servers 3-1 to 3-n. After the session has been established, RTP packets are transmitted and received via peer-to-peer connection between an IP telephone terminal on the calling party side and that on the called party side, thereby performing audio communication. The call control server 1 further has the function of requesting the media servers 2-1 to 2-m to distribute RTP packets (media packets) including at least one of video, audio, and data recorded in the media servers 2-1 to 2-m to the IP telephone terminals T11 to T1i via multicast or unicast transmission to transmit video, audio, or the like to the IP telephone terminals T1 to T1i when a call between IP telephone terminals T11 to T1i has been put on hold.

A system that distributes packets via multicast transmission can make smaller the number of streams distributed by the media servers 2-1 to 2-m than a system that distributes packets via unicast transmission on a terminal basis, which enables the same media packets to be distributed to the IP telephone terminals T11 to T1i efficiently. However, in the same network or in an environment via routers, all the devices in the network must be compatible with multicast transmission, which limits an environment in which multicast transmission can be used.

In the embodiment, suppose RTP packets (media packets) are distributed to the IP telephone terminals T11 to T1i via unicast transmission.

A gateway GW is connected to the IP network INW. The gateway GW, which makes a connection between the IP network INW and a public network NW, such as an analog telephone network, has the function of converting a communication protocol and a signal format between the IP network INW and public network NW. A telephone terminal T21, such as a standard telephone is connected to the public network NW.

The call control server 1 has a function related to the embodiment described below. FIG. 2 is block diagram showing a configuration of the call control server 1.

Specifically, the call control server 1 comprises an IP control module 11, an IP packet relay module 12, a call control module 13, and a storage module 14. The IP control module 11, IP packet relay module 12, call control module 13, and storage module 14 are connected to one another via a data highway 15.

The IP network INW is connected to the IP control module 11 as needed. The IP control module 11 performs an interface process in connection with the IP network INW. The IP control module 11 exchanges various pieces of control information on the interface process with the call control module 13 via the data highway 15.

An audio gateway module 16 is connected to the IP packet relay module 12. The IP packet relay module 12 processes a control packet and an audio packet received by the IP control module 11. The IP packet relay module 12 converts a packet into a PCM signal and outputs the signal to the audio gateway module 16. The IP packet relay module 12 further converts a PCM signal from the audio gateway module 16 into a packet and outputs the packet to the IP control module 11.

The call control module 13, which comprises a CPU, a ROM, and a RAM, controls various parts of the call control server 1 by software processing.

The storage module 14 stores routing information and others necessary for connection control of the call control module 13.

The storage module 14 includes a connection information database 141 serving as a connection management table, a media server listening information database 142 (hereinafter, referred to as database 142), and a distribution server connection information database 143 (hereinafter, referred to as database 143). The connection information database 141 stores data that represents the correspondence relationship between telephone numbers serving as terminal IDs identifying IP telephone terminals T11 to T1i to be connected, server identification data serving as server IDs identifying media servers 2-1 to 2-m, codec, packet transmission interval, listening tone, and intended use. Here, information representing codec is information that makes it possible to identify an encoding name, a clock rate, the number of audio channels, and an encoding parameter.

The database 142 stores data that represents the correspondence relationship between the telephone numbers of IP telephone terminals T11 to T1i acting as sound sources, server identification data on media servers 2-1 to 2-m, the telephone numbers of IP telephone terminals T11 to T1i serving as listeners, and server identification data on media servers 2-1 to 2-m.

The database 143 stores data that represents the correspondence relationship between identification data on distribution servers 3-1 to 3-n, the telephone numbers of IP telephone terminals T11 to T1i to be connected to the input terminals of the distribution servers 3-1 to 3-n, server identification data on media servers 2-1 to 2-m, the telephone numbers of IP telephone terminals T11 to T1i to be connected to the input terminals of distribution servers 3-1 to 3-n, and server identification data on media servers 2-1 to 2-m.

The call control module 13 comprises an entry control module 131, a connection configuration determination module 132 (hereinafter, referred to as determination module 132), a connection control module 133, and an update control module 134. When a call connection has been established between, for example, IP telephone terminal 11 and media server 2-1, the entry control module 131 enters the telephone number of IP telephone terminal T11, server identification data on media server 2-1, codec, packet transmission interval, listening tone, and intended use into the connection information database 141.

When unicast packets are distributed, the determination module 132 refers to the connection information database 141 and, based on the reference result, determines whether there is a call connection using the same codec.

If it has been determined based on the determination result at the determination module 132 that the same codec is used, for example, between IP telephone terminal T11 (terminal 1) and media server 2-1 (media server 1) and between IP telephone terminal T14 (terminal 4) and media server 2-4 (media server 4) and that the packet transmission intervals are the same or can be converted at distribution servers 3-1 to 3-n and the listening tone is the same, the connection control module 133 controls the IP telephone terminals T11, T14, media server 2-1, and distribution server 3-1 in such a manner that the IP telephone terminals T11, T14 are caused to make a dynamic call connection with the media server 2-1 via, for example, the distribution server 3-1. Then, after change control of the call connection, the unnecessary media server 204 is freed.

When a call connection between IP telephone terminals T11, T14, media server 2-1, and distribution server 3-1 has been established, the update control module 134 updates the contents stored in each of the connection information database 141, database 142, and database 143.

FIG. 4 is a block diagram showing a functional configuration of each of the media servers 2-1 to 2-m. Media server 2-1 will be explained as a representative of the rest.

Media server 2-1 comprises an IP network interface module 21, a control module 22, and a storage module 23. The IP network interface module 21 interfaces with the IP network INW.

The storage module 23 stores not only routing information and others necessary for connection control of the control module 22 but also the IP addresses of and port information on distribution servers 3-1 to 3-n that receive unicast packets.

The control module 22 comprises a unicast packet decoder 221, a packet processing module 222, and a unicast packet encoder 223. The unicast packet decoder 221 decodes input unicast RTP packets into audio information or video information.

The packet processing module 222 performs packet processing, including the creation of tones and holding tones, the composition of audio information or video information, the change of packet transmission intervals, and media conversion.

The unicast packet encoder 223 encodes audio information or video information subjected to packet processing at the packet processing module 222 into RTP packets and sends them to a destination.

FIG. 5 is a block diagram showing a functional configuration of each of the distribution servers 3-1 to 3-n. Distribution server 3-1 will be explained as a representative of the rest.

Distribution server 3-1 comprises an IP network interface module 31, a control module 32, and a storage module 33. The IP network interface module 31 interfaces with the IP network INW.

The storage module 33 stores not only routing information and others necessary for connection control of the control module 32 but also the IP addresses of and port information on IP telephone terminals T11 to T1i that receive unicast packets.

The control module 32 comprises an information rewrite module 321 and a packet transmission module 322. The information rewrite module 321 rewrites, for example, information in the header part of an RTP packet received from media server 2-1 into information that can be processed at IP telephone terminals T11, T14 to be connected to distribution server 3-1. For example, the information rewrite module 321 rewrites the IP address of and port information on distribution server 3-1 superimposed on the header part of the RTP packet into the IP address of and port information on IP telephone terminals T11, T14.

The packet transmission module 322 divides a payload part of the RTP packet and stores the divided payload parts in the storage module 33. The payload parts stored in the storage module 33 are combined and the combined payload part is sent.

Next, the operation of the system configured as described above will be explained.

FIG. 6 shows a signal sequence in switching the communication destination of IP telephone terminal T11 from IP telephone terminal T16 to media server 2-1 during a call between IP telephone terminal T11 and IP telephone terminal T16.

Now, for example, suppose an extension voice communication is being performed between IP telephone terminals T11 and T16 as shown in FIG. 6.

Suppose, in this state, the user has performed an holding operation on IP telephone terminal T16, his or her own telephone terminal. Then, IP telephone terminal T16 sends a "hold request" to the call control server 1 via the IP network INW (FIG. 6(1)). Having received the "hold request," the call control server 1 sends "hold accepted" to the IP telephone terminal 16 (FIG. 6(2)).

Almost at the same time, the call control server 1 determines whether there is an unused media server, referring to the connection information database 141, and sends a "unicast request" to an unused media server 2-1 (FIG. 6(4)). Having received the "unicast request," the media server 2-1 sends "unicast accepted" to the call control server 1 (FIG. 6(5)).

Then, the call control server 1 switches the state of the communication between IP telephone terminal T11 and IP telephone terminal T16 to a holding state. Then, the call control server 1 transmits a "stream distribution start notice" to IP telephone terminal T11 at the called party (FIG. 6(6)).

The "stream distribution start notice" includes address information on a unicast stream distributed via unicast transmission by media server 2-1 as destination information. Having received the notice, IP telephone terminal T11 performs switching so that a holding tone packet transmitted from media server 2-1 may be received (FIG. 6(7)).

In this way, the communication destination of IP telephone terminal T11 changes from IP telephone terminal T16 at the called party to media server 2-1. This enables the user with IP telephone terminal T11 can hear a holding tone composed of a single tone or compound sound transmitted from media server 2-1.

Figure 7:
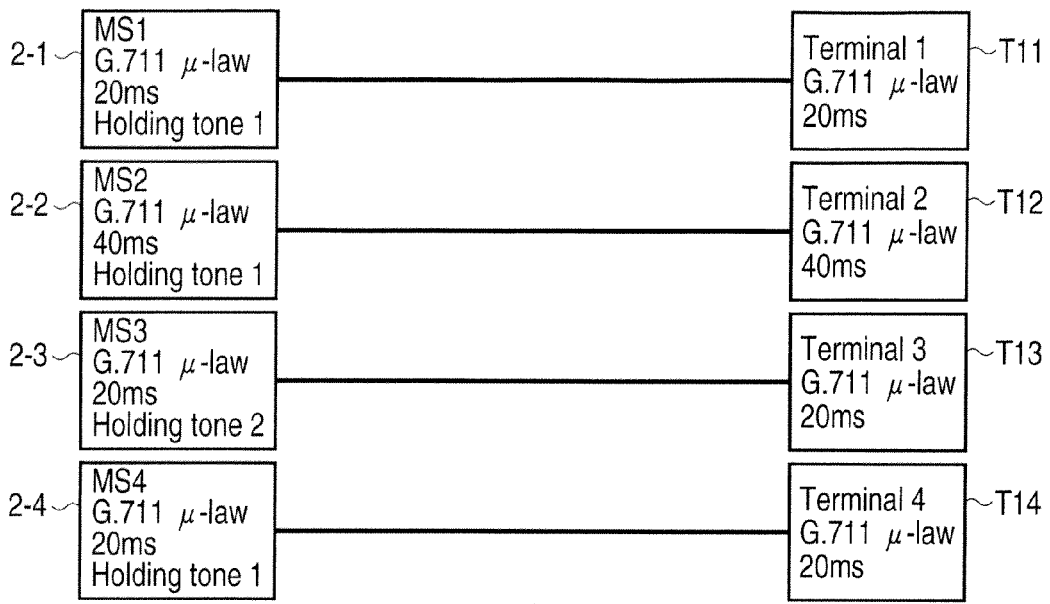
FIG. 7 shows a normal holding tone sending state.

FIG. 7 shows a normal holding tone sending state. Suppose IP telephone terminal T11 is connected to media server 2-1 in a one-to-one correspondence and is receiving a holding tone transmitted from media server 2-1. In addition, suppose IP telephone terminal T12 is connected to media server 2-2 in a one-to-one correspondence and is receiving a holding tone transmitted from media server 2-2. Moreover, suppose IP telephone terminal T13 is connected to media server 2-3 in a one-to-one correspondence and is receiving a holding tone transmitted from media server 2-3. Furthermore, suppose IP telephone terminal T14 is connected to media server 2-4 in a one-to-one correspondence and is receiving a holding tone transmitted from media server 2-4.

Figure 8:
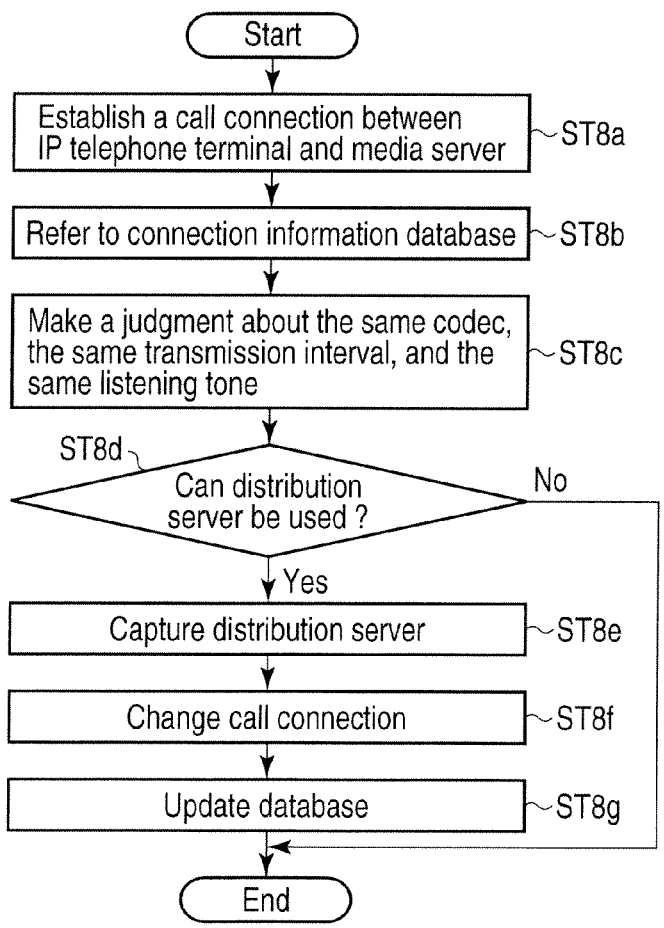
FIG. 8 is a flowchart to explain the procedure for control processing at a call control module of the IP telephone apparatus according to the first embodiment.

The call control module 13 of the call control server 1 performs the procedure for control processing shown in FIG. 8. First, the call control module 13 of the call control server 1 shifts the state from block ST8a to block ST8b. In block ST8b, the call control module 13 refers to the connection information database 141 and, based on the reference result, lists IP telephone terminals T11 to T14 which are hearing the same holding tone with the same codec at the same packet transmission intervals or at packet transmission intervals that can be converted at distribution servers 3-1 to 3-n, and puts them together into a group (block ST8c). Then, the call control module 13 of the call control server 1 determines whether distribution servers 3-1 to 3-n can be used by IP telephone terminals T11 to T14 that are hearing the same holding tone with the same codec at the same packet transmission intervals or at packet transmission intervals that can be converted at distribution servers 3-1 to 3-n (block ST8d).

When a case where distribution servers 3-1 to 3-n do not have the function of converting the packet transmission interval is considered, it is seen that IP telephone terminal T11 (terminal 1) and IP telephone terminal T14 (terminal 4) are hearing the same holding tone 1 with the same codec at the same packet transmission intervals or at packet transmission intervals that can be converted at distribution servers 3-1 to 3-n.

Then, the call control module 13 of the call control server 1 captures distribution server 3-1 for IP telephone terminal T11 (terminal 1) and IP telephone terminal T14 (terminal 4) (block ST8e). Distribution server 3-1 to be captured may be the one found first. When distribution servers 3-1 to 3-n are provided on a plurality of devices, the one operating on a device with the lightest load may be used.

Then, the call control module 13 of the call control server 1 shifts the state from block ST8e to block ST8f. In block ST8f, the call control module 13 connects IP telephone terminals T11, T14 in the group to the output side of distribution server 3-1. The call control module 13 connects any one of the media servers used by terminals in the group to the input side of distribution server 3-1. A media server (a media server to be left) to be connected to the input side may be the one found first. When media servers are provided on a plurality of devices, if there is a media server operating on the same device as that of the distribution server, the media server may be left or a media server operating on a device with the lightest load may be left.

As shown in FIG. 9, it has been assumed that IP telephone terminal T11 and IP telephone terminal T14 are connected to the output side of distribution server 3-1 and media server 2-1 used by IP telephone terminal T11 is connected to the input side of distribution server 3-1. This causes media server 2-2 used by IP telephone terminal T14 to be freed and allowed to be used for another intended purpose. This operation is performed on all the groups obtained by listing the IP telephone terminals which are hearing the same holding tone with the same codec at the same packet transmission intervals or at packet transmission intervals that can be changed at distribution servers. This process may be terminated at the time when as many media servers 3-2 to 3-n as are needed are freed.

After this, the call control module 13 of the call control server 1 updates the information entered in the connection information database 141, database 142, and database 143 (block ST8g).

Then, the contents stored in the connection information database 141 of the call control server 1 makes data that represents the correspondence relationship between the telephone numbers of IP telephone terminals T11 and T14 to be connected, server identification data on media server 2-1, server identification data on distribution server 3-1, codec, packet transmission interval, listening tone, and intended use as shown in FIG. 10.

The contents stored in the database 143 of the call control server 1 makes data that represents the correspondence relationship between the telephone numbers of IP telephone terminals T11 and T14 to be connected, server identification data on media server 2-1, and server identification data on distribution server 3-1 as shown in FIG. 11.

As described above, in the first embodiment, the connection information database 141 is provided in the storage module 13. The connection information database 141 causes the telephone numbers of IP telephone terminals T11 to T1i to be connected, server identification data on media servers 2-1 to 2-m, codec information used between a telephone terminal and a media server, and packet transmission interval to correspond to one another on a call basis when a call connection related to unicast packet distribution is established in the call control server 1. When unicast packet distribution is performed, the connection information determination module 122 determines whether there is a call connection using the same codec, referring to the connection information database 141. When the same codec is used between IP telephone terminal T11 and media server 2-1 and between IP telephone terminal T14 and media server 2-4 and the packet transmission interval is the same or can be converted at distribution servers 3-1 to 3-n, the connection control module 133 connects IP telephone terminals T11, T14 to the output terminal of distribution server 3-1 and media server 2-1 to the input terminal of distribution server 3-1 and frees media server 2-4.

Therefore, since media servers 2-1 to 2-m are connected only as needed in distributing unicast packets, when a small number of media servers 2-1 to 2-m and resources are used by IP telephone terminals T11 to T1i larger in number than media servers 2-1 and resources, the effective utilization efficiency can be increased, which enables the shortage of media servers to be eliminated, while maintaining the connection via unicast transmission. In addition, since an unused media server can be produced, it is possible to easily cope with the addition of a service provided via unicast transmission.

In the first embodiment, in unicast packet distribution, RTP packets have been transferred directly from media servers 2-1 to 2-m to distribution servers 3-1 to 3-n. Therefore, the processing burden on media servers 2-1 to 2-m can be reduced. In addition, distribution servers 3-1 to 3-n have only to rewrite information in the header part of an RTP packet into information that can be processed by a telephone terminal. Moreover, even when media servers 2-1 to 2-m are used efficiently, a payload has only to be simply divided and accumulated and a media packet has only to be divided, combined, and transmitted in addition to the rewrite of the header part. Therefore, an inexpensive distribution server can be used, enabling the cost of the entire system to be reduced.

While in the first embodiment, the connection between an IP telephone terminal and media server 2-1 via unicast transmission (FIG. 7) has been changed to the connection between the IP telephone terminal and distribution server 3-1 in FIG. 9, the embodiment is not limited to this.

When a holding tone is to be connected, distribution server 3-1 may be used from the start to connect IP telephone terminals T11, T14 to media server 2-1 as shown in FIG. 9. In this case, the number of media servers 2-1 to 2-m used can be minimized by listing terminals that are hearing the same holding tone with the same codec at the same packet transmission intervals or at packet transmission intervals that can be converted at distribution servers 3-1 to 3-n as those of the holding to be connected, putting the terminals together into a group, and subjecting the group to the processes in block ST8*d* to block ST8*g* (if distribution server 3-1 has been captured, a terminal that has attempted to listen to a holding tone is only connected to the output side of distribution server 3-1). In addition, the occurrence of transitory disconnection at the time of connection change can be prevented.

(Modification of the First Embodiment)

While in the first embodiment, a case where distribution servers 3-1 to 3-n do not have the function of converting the packet transmission interval has been explained, the embodiment may be applied even to a case where distribution servers 3-1 to 3-n have the function of converting the packet transmission interval. Hereinafter, an embodiment where a distribution server has the function of converting the packet transmission interval will be explained with reference to FIG. 19. Explanation will be given taking as an example a case distribution server 3-1 has a conversion function of 40 ms→20 ms (a packet division transmitting function).

In FIG. 19, holding tone 1 being heard by IP telephone terminal T11 (terminal 1), IP telephone terminal T12 (terminal T2), and IP telephone terminal T14 (terminal 4) uses the same codec (G.711). Terminal 1 and terminal 4 use packet transmission intervals of 20 ms, whereas terminal 2 uses packet transmission intervals of 40 ms. In this case, since terminal 1 and terminal 4 differ from terminal 2 in packet transmission intervals but they are the same in codec, use of a conversion function of 40 ms→20 ms (a packet division transmitting function) of distribution server 3-1 enables conversion at distribution server 3-1.

Therefore, in the state of FIG. 7, switching is performed in such a manner that media server 2-2 is connected to the input side of distribution server 3-1 and IP telephone terminal T11, IP telephone terminal T12, and IP telephone terminal T14 are connected to the output side of distribution server 3-1. As a result, media servers 2-1 and 2-4 are freed and can be used for another use.

(Second Embodiment)

A second embodiment is a case where the embodiment is applied to paging.

FIG. 12 shows a normal paging connection state in the second embodiment.

In FIG. 12, suppose, for example, the user of IP telephone terminal T11 starts a voice paging operation of paging by voice the user at each terminal in a paging group specifying IP telephone terminals T12 to T15. In this case, the user dials a paging originating special number and a paging group number (=1) on IP telephone terminal T11. Then, IP telephone terminal T11 transmits a dial string of a paging request to the call control server 1.

The call control server 1 selects media serves 2-1 to 2-5 as resources for converting voice to be transmitted by paging and, when paging can be performed, transmits a response signal to IP telephone terminal T11.

In this way, the user of IP telephone terminal T11 can send a message to each of IP telephone terminals T12 to T15 via media servers 2-1 to 2-5. FIG. 13 shows the contents stored in the connection information database 141 of the call control server 1 in this state. FIG. 14 shows the contents stored in the database 142 of the call control server 1. In FIG. 14, listeners represent IP telephone terminals T11 to T15 (terminal 1 to terminal 5) and sound sources represent media servers 2-1 to 2-5.

Referring to the connection information database 141, the call control module 13 of the call control server 1 lists IP telephone terminals T12 to T15 that are listening to voice from the same IP telephone terminal T11 based on the reference result and groups the terminals by the same packet transmission intervals with the same codec or by packet transmission intervals that can be converted by distribution servers 3-1 to 3-n with the same codec. Here, IP telephone terminal T13 and IP telephone terminal T14 are listening to voice from IP telephone terminal T11 with G.711 μ-law, 20 ms and IP telephone terminal T12 and IP telephone terminal T15 are listening to voice from IP telephone terminal T11 converted by media servers 2-1, 2-5 with G.711 μ-law, 40 ms. Suppose distribution servers 3-1 to 3-n cannot convert the packet transmission intervals.

Then, if there is a terminal group which is communicating with the paging originating terminal, IP telephone terminal T11, with the same codec at the same packet transmission intervals or at packet transmission intervals that can be converted at distribution server 3-1, the call control module 13 of the call control server 1 performs the following on the group:

(1*a*) If the number of speakers in the group is one, the call control module 13 connects the paging originating side with the paging terminating side directly and frees the media servers.

(1*b*) If the number of speakers in the group is plural, the call control module 13 captures a distribution server. A distribution server to be captured may be the one found first. When distribution servers are provided on a plurality of devices, the one operating on a device with the lightest load may be used.

(1*c*) The call control module 13 connects a terminal in the group to the output side of a distribution server.

(1*d*) The call control module 13 connects the paging originating side to the input side of a distribution server.

(1*e*) The call control module 13 frees a media server used by a terminal connected to a distribution server.

FIG. 15 shows a paging connection state when connection has been made again so that data may be sent via distribution servers 3-1, 3-2.

In the example of FIG. 15, distribution server 3-1 is captured, IP telephone terminal T11 is connected to the input terminal of distribution server 3-1, and IP telephone terminal T13 and IP telephone terminal T14 are connected to the output terminal of distribution server 3-1.

If there is a terminal group which communicates with the call control module 13 of the call control server 1 with a codec differing from that of a terminal on the transmitting side at packet transmission intervals that cannot be converted at distribution servers 3-1 to 3-n, the call control module 13 performs the following on the group:

(The number of speakers in the group is one)

(2a) If the paging originating side is the input to a media server corresponding to the paging originating side, the call control module 13 determines the paging originating side to be the input of a media server to which a terminal on the paging terminating side is connected and frees the media server corresponding to the paging originating side.

(2b) If the paging originating side is connected to a distribution server, the call control module 13 determines the output of the distribution server to be the input to a media server to which a terminating terminal is connected.

(2c) If the paging originating side is the input to another media server, or if the paging originating side is directly connected to the paging terminating side, the call control module 13 captures a new distribution server, uses the output of the distribution server as the input to a media server to be connected this time and as the input to another media server whose paging originating side is already the input (if the paging originating side and terminating side are connected to each other directly, the output of the distribution server is connected to the terminating terminal), and connects the paging originating side to the input side of the distribution server.

(The number of speakers in the group is plural)

(3a) The call control module 13 captures a distribution server.

(3b) The call control module 13 connects a terminal in the group to the output side of the distribution server.

(3c) The call control module 13 connects the output side of any one of the media servers used by the terminals in the group to the input side of the distribution server. A media server (a media server to be left) to be connected to the input side may be the one found first. When media servers are provided on a plurality of devices, if there is a media server operating on the same device as that of the distribution server, the media server may be left or a media server operating on a device with the lightest load may be left.

(3d) The call control module 13 frees media servers excluding the media servers used by the terminals in the group.

In the example of FIG. 15, since IP telephone terminal T12 and IP telephone terminal T15 which are the same as IP telephone terminal T11 on the paging originating side in codec and differ in packet transmission interval from IP telephone terminal T11 need conversion at media server 2-2, they are connected to the output terminal of distribution servers 3-2 connected to the output side of media server 2-2 and media server 2-2 is connected to the input terminal of distribution server 3-2. As for IP telephone terminal T13 and IP telephone terminal T14 which are the same as IP telephone terminal T11 on the paging originating side in codec and packet transmission interval, the output of distribution server 3-1 connected to the input terminal of distribution server 3-2 is the input to media server 2-2.

As a result, media server 2-1 used by IP telephone terminal T11 is freed and media servers 2-3 to 2-5 used by IP telephone terminals T13 to T14 are freed and can be used for another use. This operation is performed on all the groups obtained by listing terminals that are hearing the same holding tone with the same codec at the same packet transmission intervals or at packet transmission intervals that can be converted at a distribution server. At the time when as many media servers as are needed are freed, the process may be terminated.

Thereafter, the call control module 13 of the call control server 1 updates the contents entered in each of the connection information database 141, database 142, and database 143.

Then, as shown in FIG. 16, the connection information database 141 stores data that represents the correspondence relationship between the telephone numbers of IP telephone terminals T11 to T15 to be connected, server identification data on media server 2-2, server identification data on distribution servers 3-1, 3-2, codec, packet transmission interval, listening tone, and intended use.

As shown in FIG. 17, the database 143 stores data that represents the correspondence relationship between the telephone numbers of IP telephone terminals T12 to T15 to be connected, server identification data on media server 2-2, and server identification data on distribution servers 3-1, 3-2.

Furthermore, the contents stored in the database 142 are as shown in FIG. 18.

What has been explained is about a case where an IP telephone terminal has already been connected to a media server. When connecting a paging terminating terminal to a media server, the call control module 13 performs the following procedure:

(4a) When connecting a terminal that uses the same codec as that of the paging originating speaker at the same packet transmission intervals or at packet transmission intervals that can be converted at a distribution server, the call control module 13 carries out (2a) to (2c) (if having already captured a distribution server, the call control module 13 simply connects the paging terminating terminal to the output side of the distribution server).

(4b) When connecting a terminal which uses a codec differing from that of the paging originating speaker at packet transmission intervals that cannot be converted at a distribution server, the call control module 13 carries out (3a) to (3d) (if having already captured a distribution server, the call control module 13 simply connects the paging terminating terminal to the output side of the distribution server). This enables a paging configuration that minimizes the number of media servers used.

While in the example, distribution servers 3-1 to 3-n have been separated on a capture basis, the input to a distribution server may be divided into a plurality of inputs, thereby enabling the same distribution server to manage the inputs. In this case, the inputs are managed as follows: input 1, outputs 1-1, 1-2, . . . , input 2, output 2-1.

As described above, even the second embodiment produces the same operational advantage as that of the first embodiment. In addition, even if the codec used is the same, when the intervals at which media servers 2-1 to 2-m transmit RTP packets to IP telephone terminals T11 to T1i cannot be converted at distribution servers 3-1 to 3-n, distribution servers 3-1 to 3-n which RTP packets go through can be changed on a RTP packet transmission interval basis. This makes it possible to switch to the optimum call connection according to the type of IP telephone terminal or the like. In addition, when paging is performed, for example, if media server 2-1 may not be used, media server 2-1 can be bypassed using distribution server 3-1. This prevents a media server from being used unnecessarily, increasing the rate of utilization of media servers and resources.

Furthermore, in the second embodiment, the connection has been changed from the state of FIG. 12 to the state of FIG. 15. If the codec used in IP telephone terminals T11 to T15 and the transmission intervals are known, IP telephone terminals T12 to T15 on the paging terminating side may be connected to IP telephone terminal T11 on the paging originating side as shown in FIG. 15 by using distribution servers 3-1, 3-2 from the start.

(Modification of the Second Embodiment)

In the second embodiment, a case where distribution servers 3-1 to 3-n cannot convert the packet transmission intervals has been explained. However, the embodiment is not limited to this and may be applied to a case where distribution servers 3-1 to 3-n have the function of converting the packet transmission intervals. Hereinafter, an embodiment where distribution servers 3-1 to 3-n have the function of converting the packet transmission intervals will be explained with reference to FIG. 20.

When distribution server 3-1 has a conversion function of 20 ms→40 ms (a payload accumulation packet combining transmission function), IP telephone terminal T12 (terminal 2) to IP telephone terminal T15 (terminal 5) are listening to voice from the same IP telephone terminal T11 with the same codec at packet transmission intervals that can be converted at distribution server 3-1. Therefore, as shown in FIG. 20, IP telephone terminal T11 is connected to the input side of distribution server 3-1 and IP telephone terminal T12 to IP telephone terminal T15 are connected to the output side of distribution server 3-1. Then, media servers 2-1 to 2-5 are freed and can be used for another use.

(Other Embodiments)

This embodiment is not limited to the above embodiments. For instance, while in the embodiments, an RTP packet determined in RFC3550 has been used as a media packet distributed from a media server, the embodiment may be applied to any suitable media packet, provided that the media packet has a structure where audio information is provided in the form of a payload so as to be separated from a header.

Furthermore, the embodiment may be practiced or embodied in still other ways without departing from the spirit or essential character thereof in connection with the system configuration, the configuration of an IP telephone apparatus, the functional configuration of a media server, the functional configuration of a distribution server, the types of media files to be distributed, the contents stored in a connection information database, the procedure for reconnecting an IP telephone terminal to a media server via distribution server, and the like.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A telephone system comprising:
   a plurality of telephone terminals connected to a communication network;
   a telephone exchange apparatus configured to make a call connection between the telephone terminals;
   a plurality of media servers each of configured to perform unicast packet distribution according to an instruction of the telephone exchange apparatus, wherein the unicast packet distribution distributes a media packet including at least one of video, audio, and data to a requesting telephone terminal; and
   a distribution server configured to perform a part of the function of the media server and distribute an input media packet to the telephone terminals,
   wherein the telephone exchange apparatus comprises
   a memory configured to store a connection management table indicating a correspondence relation between a terminal ID, a server ID and codec information, when a call connection related to the unicast packet distribution is established, wherein the terminal ID that identifies a telephone terminal to be connected, the server ID that identifies the media server, and codec information used between the telephone terminal and the media server to correspond to one another,
   a determination module configured to refer to the connection management table when performing the unicast packet distribution, and determine whether there is a call connection using the same codec information based on a reference result of the connection management table, and
   a controller configured to switch media packet distribution to a plurality of telephone terminals using the same codec to media packet distribution via the distribution server, and perform media packet distribution the plurality of telephone terminals using the same codec via the distribution server, when there are call connections using the same codec in a plurality of call connections based on the determination result at the determination module.

2. The telephone system of claim 1, wherein the controller connects a first and a second telephone terminal to the distribution server and the distribution server to a first media server and frees a second media server, and make the first media server transmit to the first and the second telephone terminal via the distribution server, when the same codec is used between the first telephone terminal and the first media server and between the second telephone terminal and the second media server based on the determination result at the determination module.

3. The telephone system of claim 1, wherein the memory stores a connection management table indicating a correspondence relation between a terminal ID, a server ID, codec information and packet transmission intervals, at each of a call, wherein the terminal ID that identifies a telephone terminal to be connected, wherein the server ID that identifies the media server, wherein the codec information used between the telephone terminal and the media server, wherein the packet transmission intervals at which the media server sends a media packet to the telephone terminal,
   the determination module refers to the connection management table and determines whether there is a call connection using the same codec information and whether there is a call connection at the same packet transmission intervals or at packet transmission intervals that can be converted at a distribution server, based on a reference result of the connection management table, and
   the controller uses the same codec in a plurality of call connections based on the determination result at the determination module and changes dynamically to a call connection with a distribution server to go through differing at each of a packet transmission intervals, when the packet transmission intervals cannot be converted at a distribution server.

4. The telephone system of claim 1, wherein the distribution server comprises an information change module configured to rewrite information in a header part of the media packet into information that can be processed by the telephone terminal when the media packet includes the header part and a payload part and
a transmitter configured to divide a media packet, combine media packets, and transmit the resulting media packet.

5. A telephone exchange apparatus performing a call connection between telephone terminals connected to a communication network and causing a media server connected to the communication network to perform unicast packet distribution whereby a media packet including at least one of video, audio, and data is distributed to a requesting telephone terminal, the telephone exchange apparatus comprising:
a connector configured to perform a part of the function of the media server and connect a distribution server that distributes an input media packet to the telephone terminals;
a memory configured to store a connection management table indicating a correspondence relation between a terminal ID, a server ID and codec information, when a call connection related to the unicast packet distribution is established, wherein the terminal ID that identifies a telephone terminal to be connected, the server ID that identifies the media server, and codec information used between the telephone terminal and the media server to correspond to one another;
a determination module configured to refer to the connection management table when performing the unicast packet distribution, and determine whether there is a call connection using the same codec information based on reference result of the connection management table; and
a controller configured to switch media packet distribution to a plurality of telephone terminals using the same codec to media packet distribution via the distribution server, and perform media packet distribution the plurality of telephone terminals using the same codec via the distribution server, when there are call connections using the same codec in a plurality of call connections based on the determination result at the determination module.

6. The telephone exchange apparatus of claim 5, wherein the controller connects a first and a second telephone terminal to the distribution server and the distribution server to a first media server and frees a second media server, and make the first media server transmit to the first and the second telephone terminal via the distribution server, when the same codec is used between the first telephone terminal and the first media server and between the second telephone terminal and the second media server based on the determination result at the determination module.

7. The telephone exchange apparatus of claim 5, wherein the memory stores a connection management table indicating a correspondence relation between a terminal ID, a server ID, codec information and packet transmission intervals, at each of a call, wherein the terminal ID that identifies a telephone terminal to be connected, wherein the server ID that identifies the media server, wherein the codec information used between the telephone terminal and the media server, wherein the packet transmission intervals at which the media server sends a media packet to the telephone terminal,
the determination module refers to the connection management table and determines whether there is a call connection using the same codec information and whether there is a call connection at the same packet transmission intervals or at packet transmission intervals that can be converted at a distribution server based on a reference result of the connection management table, and
the controller uses the same codec in a plurality of call connections based on the determination result at the determination module and changes dynamically to a call connection with a distribution server to go through differing at each of packet transmission intervals that cannot be converted at a distribution server, when packet transmission intervals cannot be converted at a distribution server.

8. A connection control method used in a telephone exchange apparatus performing a call connection between telephone terminals connected to a communication network and causing a media server connected to the communication network to perform unicast packet distribution whereby a media packet including at least one of video, audio, and data is distributed to a requesting telephone terminal, the connection control method comprising:
performing a part of the function of the media server and connecting a distribution server that distributes an input media packet to the telephone terminals;
storing in a memory a connection management table indicating a correspondence relation between a terminal ID, a server ID and codec information, when a call connection related to the unicast packet distribution is established, wherein the terminal ID that identifies a telephone terminal to be connected, the server ID that identifies the media server, and codec information used between the telephone terminal and the media server to correspond to one another;
referring to the connection management table when performing the unicast packet distribution;
determining whether there is a call connection using the same codec information based on a reference result of the connection management table;
performing a part of the function of the media server and capturing a distribution server that distributes an input media packet to the telephone terminals when there are call connections using the same codec in a plurality of call connections based on the determination result at the determining; and
switching media packet distribution to a plurality of telephone terminals using the same codec to media packet distribution via the distribution server, and performing media packet distribution the plurality of telephone terminals using the same codec via the distribution server.

* * * * *